(12) United States Patent
Tauk et al.

(10) Patent No.: US 9,304,312 B1
(45) Date of Patent: Apr. 5, 2016

(54) ELECTROWETTING ELEMENT AND MANUFACTURE METHOD

(71) Applicant: Amazon Technologies, Inc., Seattle, WA (US)

(72) Inventors: Lara Tauk, Eindhoven (NL); Sukhdip Sandhu, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/488,539

(22) Filed: Sep. 17, 2014

(51) Int. Cl.
  *G02B 26/00* (2006.01)
  *G02B 26/02* (2006.01)
  *G09G 3/34* (2006.01)

(52) U.S. Cl.
  CPC ............ *G02B 26/005* (2013.01); *G02B 26/004* (2013.01); *G09G 3/348* (2013.01); *B01L 2400/0427* (2013.01); *B32B 2307/728* (2013.01); *B32B 2307/73* (2013.01); *G02B 26/02* (2013.01)

(58) Field of Classification Search
  CPC .... G02B 26/00; G02B 26/004; G02B 26/005; G02B 26/02; G09G 3/34; G09G 3/348; G09G 3/3433; B01L 2400/04; B01L 2400/0427; B32B 2307/728; B32B 2307/73
  USPC .......................... 359/290, 291, 228, 245, 253; 252/519.21, 519.2, 500, 582, 583; 106/31.49, 287.2, 287.24; 534/560, 534/561
  See application file for complete search history.

(56) References Cited

U.S. PATENT DOCUMENTS

| 5,395,721 | A | * | 3/1995 | Kato et al. | ............... | G03F 3/105 430/125.31 |
| 2003/0230487 | A1 | | 12/2003 | Yanagisawa | | |
| 2011/0235157 | A1 | | 9/2011 | Mueller-Marc et al. | | |
| 2015/0331231 | A1 | | 11/2015 | Chen | | |

FOREIGN PATENT DOCUMENTS

WO    2011135044 A1    11/2011

OTHER PUBLICATIONS

Savadogo, O., "Emerging membranes for electrochemical systems: (I) solid polymer electrolyte membranes for fuel cell systems", Journal of New Materials for Electrochemical Systems 1, pp. 47-66, 1998.
Dupont, "DuPont Fuel Cells", http://www2.dupont.com/FuelCells/en_US/assets/downloads/dfc103.pdf, Mar. 2014, pp. 1-2.

* cited by examiner

*Primary Examiner* — Loha Ben
(74) *Attorney, Agent, or Firm* — BainwoodHuang

(57) ABSTRACT

An electrowetting element includes a support plate with a layer with a first surface for adjoinment by a fluid. The layer is formed at least partly of a material having a backbone which is substantially apolar and at least one chain pendant from the backbone and terminating with a substantially polar group.

24 Claims, 2 Drawing Sheets

ELECTROWETTING ELEMENT AND MANUFACTURE METHOD

BACKGROUND

Known electrowetting display devices include two support plates. In examples, a pattern of walls is arranged on one of the support plates, the pattern defining picture elements of the display device. An area defined by the walls of a picture element, also known as a pixel, is called the display area, over which a display effect occurs. The walls of the picture elements may be made of a hydrophilic material. The area of the support plate in the display area may to a large extent be hydrophobic for a proper operation of the picture element. During manufacture the area of the support plate where the picture elements are located is covered by a hydrophobic layer. The walls are made on this layer by depositing a layer of wall material on the hydrophobic layer and patterning the layer of wall material using for example a photolithographic method.

To improve adhesion between the layer of wall material and the hydrophobic layer, it is known to lower the hydrophobicity of the hydrophobic layer prior to applying the layer of wall material. After the formation of the walls, the area of the hydrophobic layer between the walls is annealed to regain its hydrophobicity. However, the quality of display devices made using this method is not optimum.

It is desirable to provide an improved method for manufacturing an electrowetting display device.

DETAILED DESCRIPTION

Details of substituent groups and atoms which will be referred to herein are first described. These meanings apply unless explicitly stated to the contrary.

An alkyl group as referred to herein is a straight chain or a branched alkyl group, not a cyclic group as these are too restrictive in terms of flexibility of a linker side chain L described below.

A fluoroalkyl group as referred to herein is a straight chain or a branched alkyl group in accordance with the description of an alkyl group given in the paragraph above with at least one of the hydrogen atoms replaced by a fluorine atom (F), and with at least one hydrogen atom not being replaced.

A perfluorinated alkyl group as referred to herein is a straight chain or a branched alkyl group in accordance with the description of an alkyl group given in the paragraph above with each of the hydrogen atoms replaced by a fluorine atom (F).

An alkylene group as referred to herein is a straight chain or a branched divalent aliphatic hydrocarbon group having the general formula $-C_mH_{2m}-$.

A fluoroalkylene group referred to herein is a straight chain or a branched alkylene group in accordance with the description of an alkylene group given in the paragraph above with at least one of the hydrogen atoms replaced by a fluorine atom (F), and with at least one hydrogen atom not being replaced.

A perfluorinated alkylene group referred to herein is a straight chain or a branched alkylene group in accordance with the description of an alkylene group given in the paragraph above with each of the hydrogen atoms replaced by a fluorine atom (F).

An ether group referred to herein is a functional group including the formula $-CH_2OCH_2-$.

A fluoroether group is an ether group described above but with at least one hydrogen atom H replaced by a fluorine atom F, but with at least one hydrogen atom H not replaced.

A perfluorinated ether group is an ether group described above but with all hydrogen atoms H replaced by a fluorine atom F.

Examples will now be described.

Figure 1:
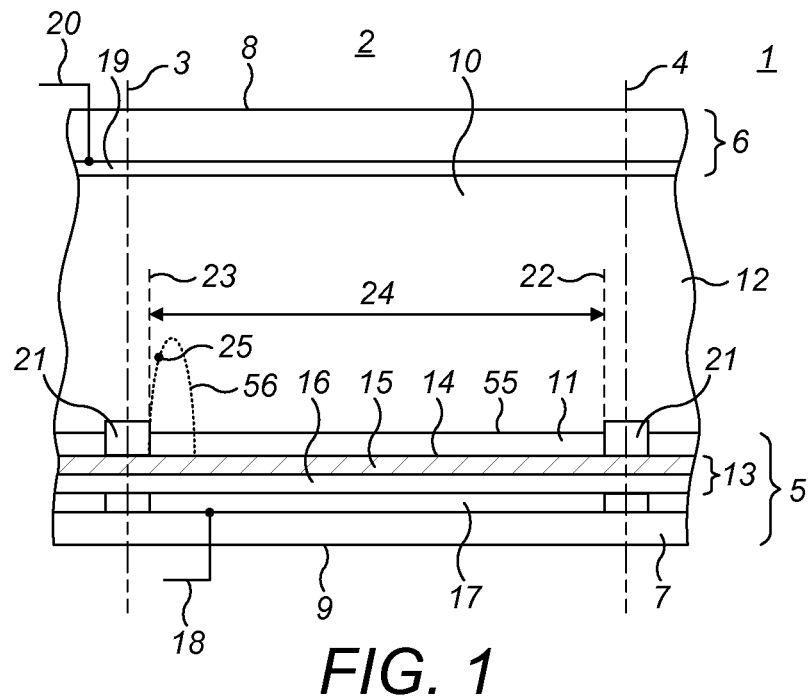
FIG. 1 shows schematically an example electrowetting display element.

FIG. 1 shows a diagrammatic cross-section of part of an example of an electrowetting display device 1, including a plurality of picture elements or display elements 2, one of which is shown in the Figure and which may also be referred to as an electrowetting cell, an electrowetting element or an electrowetting pixel. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 6, 7 and may be rigid or flexible.

The display device has a viewing side 8 on which an image or display formed by the display device can be viewed and a rear side 9. In the Figure a surface of the first support plate 5, which surface is in this example a surface of the substrate 7, defines the rear side 9; a surface of the second support plate 6, which surface is in this example a surface of the substrate 6, defines the viewing side; alternatively, in other examples, a surface of the first support plate may define the viewing side. The display device may be of the reflective, transmissive or transflective type. The display device may be an active matrix driven display device. The plurality of display elements may be monochrome. For a colour display device the display elements may be divided in groups, each group having a different colour; alternatively, an individual display element may be able to show different colours.

A space 10 of each display element between the support plates is filled with two fluids: a first fluid 11 and a second fluid 12 at least one of which may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface labelled 55 in FIG. 1 for when no voltage is applied and labelled 56 for when a voltage is applied, which interface defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is electrically conductive and/or polar and may be water, or a salt solution such as a solution of potassium chloride in water. The second fluid may be transparent; it may instead be coloured, for example, or absorbing. The first fluid, which is electrically non-conductive, may for example be an alkane like decane or hexadecane, silicone oil or decalin (otherwise known as bicyclo-4,4,0-decane).

The first fluid may absorb at least a part of the optical spectrum. The first fluid may be transmissive for a part of the optical spectrum, forming a colour filter. For this purpose the first fluid may be coloured by addition of pigment particles or a dye. Alternatively, the first fluid may be black, i.e. absorb substantially all parts of the optical spectrum, or reflecting. A reflective first fluid may reflect the entire visible spectrum, making the layer appear white, or part of it, making it have a colour.

The support plate 5 includes a layer with a surface for adjoinment by a fluid such as the first fluid described herein. In examples described herein, the layer is an insulating layer 13. The insulating layer may be transparent or reflective. The insulating layer 13 may extend between walls of a display element. To avoid short circuits between the second fluid 12 and electrodes arranged under the insulating layer, layers of the insulating layer may extend uninterrupted over a plurality of display elements 2, as shown in the Figure. The insulating layer has a surface 14 facing, i.e. closest to, the space 10 of the display element 2. An extent of the surface corresponding to the extent of the display area described below is referred to herein as the first surface and is in this example hydrophobic. The thickness of the insulating layer may be less than 2 micrometers and may be less than 1 micrometer.

The insulating layer in examples described herein is formed of a different material, which for example is an ionomer, compared with known examples. This will be explained in further detail further below. The insulating layer may be formed solely of such a different material; alternatively, the insulating layer may be formed of a layer 15 of the different material and a barrier layer 16 with predetermined dielectric properties, the different material 15 facing, i.e. being closer to, the space 10, as shown in the Figure. The layer of different material is schematically illustrated in FIG. 1. The barrier layer 16 may have a thickness, taken in a direction perpendicular the plane of the substrate, between 50 nanometers and 500 nanometers and may be made of an inorganic material like silicon oxide or silicon nitride or a stack of these (for example, silicon oxide-silicon nitride-silicon oxide) or an organic material like polyimide or Parylene.

In the absence of an applied voltage, the hydrophobic character of the first surface causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each display element 2 includes a first electrode 17 as part of the support plate 5. In examples shown there is one such electrode 17 per element. The electrode 17 is electrically insulated from the first and second fluids by the insulating layer 13; electrodes of neighbouring display elements are separated by a nonconducting layer. In some examples, further layers may be arranged between the insulating layer 13 and the electrode 17. The electrode 17 can be of any desired shape or form. The electrode 17 of a display element is supplied with voltage signals by a signal line 18, schematically indicated in the Figure.

The support plate 6 for example includes a second electrode 19, which may extend between walls of a display element or extend uninterruptedly over a plurality of display elements 2, as shown in the Figure. The electrode 19 is in electrical contact with the conductive second fluid 12 and is common to all display elements. The electrode may be made of for example the transparent conductive material indium tin oxide (ITO). A second signal line 20 is connected to the electrode 19. Alternatively, the electrode may be arranged at a border of the support plates, where it is in electrical contact with the second fluid. This electrode may be common to all elements, when they are fluidly interconnected by and share the second fluid, uninterrupted by walls. The display element 2 can be controlled by a voltage V applied between the signal lines 18 and 20. The signal line 18 can be coupled to a matrix of control lines on the substrate 7. The signal line 20 is coupled to a display driving system.

The first fluid 11 in this example is confined to one display element by walls 21 that follow the cross-section of the display element. The cross-section of a display element may have any shape; when the display elements are arranged in a matrix form, the cross-section is usually square or rectangular. Although the walls are shown as structures protruding from the insulating layer 13 and formed on a second surface of the insulating layer 13, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The extent of the display element, indicated by the dashed lines 3 and 4, is defined by the center of the walls 21. The area of the first surface between the walls of a display element, i.e. the first surface, indicated by the dashed lines 22 and 23, is called the display area 24, over which a display effect occurs. The area of the second surface on which the walls are formed may be referred to as the wall area. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied to the electrodes of the display element. The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

Figure 2:
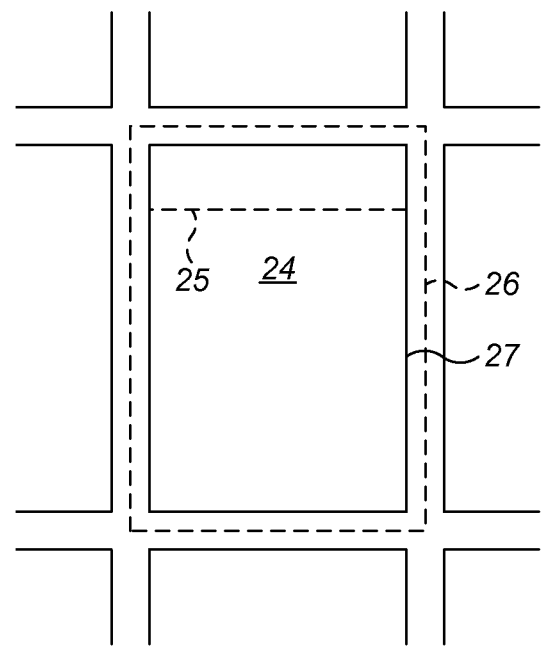
FIG. 2 shows a plan view of the example display element.

FIG. 2 shows a matrix of rectangular picture elements in a plan view of the hydrophobic first surface of the first support plate. The extent of the central picture element in FIG. 2, corresponding to the dashed lines 3 and 4 in FIG. 1, is indicated by the dashed line 26. Line 27 indicates the inner border of a wall; the line is also the edge of the display area 23.

When a zero or substantially zero voltage is applied between the electrodes 17 and 19, i.e. when the electrowetting element is in an off state, the first fluid 11 forms a layer between the walls 21, as shown in the FIG. 1. Application of a voltage will contract the first fluid, for example against a wall as shown by the dashed shape 25 in FIG. 1 or FIG. 2. The controllable shape of the first fluid, in dependence on the magnitude of applied voltage, is used to operate the picture element as a light valve, providing a display effect over the display area 23. For example, switching the fluids to increase adjoinment of the second fluid with the display area may increase the brightness of the display effect provided by the element.

This display effect determines the display state an observer will see when looking towards the viewing side of the display device. The display state can be from black to white with any intermediate grey state; in a colour display device, the display state may also include colour.

In known electrowetting display devices, the layer is formed of a hydrophobic material, for example Teflon® AF1600. However, in examples described herein, it has now been found that a different material may be used than for example Teflon AF1600, for at least partly forming a layer, for example a layer such as the insulating layer 13 and for providing the hydrophobic surface for adjoinment by the first fluid and, depending on the magnitude of the applied voltage, the second fluid. This different material is a material having at least one molecule with a backbone which is substantially apolar (i.e. non-polar) and at least one chain pendant from (i.e. extending or hanging from) the backbone and terminating with a substantially polar group. The material may therefore be a polymer in examples. In some examples the material may be considered an amphiphile, i.e. an amphiphilic material, which has a substantially polar region and a substantially non-polar region. In some examples such an amphiphilic material may be an ionomer, i.e. an ionomeric material, where the substantially polar group is ionisable, i.e. the substantially polar group is capable of dissociating to form an anion and a cation. An example of such an ionisable group is a carboxylic acid group, i.e. —COOH.

The substantially polar functionality is for example provided by the presence of at least one polar functional group in a molecule of the material; a polarity in examples depends on the electronegativity of two atoms bonded together. For example, a polar functional group comprises a hydrogen atom H bonded to an oxygen atom O or a nitrogen atom N or a sulphur atom S; in some examples, as described above for ionomeric materials, this polar group may tend to dissociate. A polar functional group, such as those just described, may have an affinity for being wet by a material for forming a wall of an electrowetting element, for example a photoresist material such as SU8; this property is used in examples to provide the wettability of the second surface, for adhering at least one wall as described above to the insulating layer. Further details of forming such a wall are described further below. In examples, the polar functional group may provide a hydrophilic functionality, i.e. a tendency to mix with or be wetted by water, i.e. the polar functional group may have an affinity for being wet by water, rather than for repelling water.

The substantially non-polar functionality is for example provided by the presence of at least one apolar, i.e. non-polar, part of a molecule of the material. Such non-polar functionality is in examples provided by the presence of non-polar groups of atoms, i.e. groups which are not polar. Examples of such non-polar groups include a C—H group, i.e. a hydrogen H atom bonded to a carbon C atom, a C—C group, i.e. a carbon atom C bonded to a carbon atom C, and/or a C—F group, i.e. a carbon atom C bonded to a fluorine atom F. In examples, the non-polar functionality may provide a hydrophobic functionality, i.e. a property of part of the molecule for repelling water; in other words an aversion for being wetted by or mixing with water. The non-polar functionality may therefore provide an affinity for being wet by the first fluid when no, i.e. a zero, voltage is applied to the electrowetting element; this property is used in examples to provide the wettability of the first surface for adjoining the first fluid, as described above.

In known methods, which use for example Teflon® 1600 to provide a hydrophobic layer as part of the insulating layer, a surface of the hydrophobic layer needs to be treated, for example using reactive ion etching (RIE), to reduce its hydrophobicity, so that a hydrophilic wall material may then be applied to the surface of the hydrophobic layer. Otherwise, without this treatment, the hydrophobic nature of the surface is unfavourable for adhering with the wall material; this can result in poorly formed and/or poorly attached walls on the hydrophobic material. Further, once the hydrophobicity has been reduced, remnants of wall material, such as SU8, may remain attached to parts of the surface of the hydrophobic material within the display area, thus contaminating the display area and potentially interfering with fluid switching in the electrowetting element. Moreover, once the walls have been formed, it is necessary to restore hydrophobicity of the surface of the hydrophobic layer within the display area; this may be done using a reflow step by exposing the hydrophobic layer to a temperature which may be higher than that using a wall formation process. However, this reflow may not fully restore the hydrophobicity of the surface to the level of hydrophobicity before the treatment to reduce the hydrophobicity.

Using the different material, for example the ionomeric material, as described above, in a material forming a layer providing a surface of the display area, i.e. the first surface described above and providing a surface on which the walls are formed, i.e. the second surface described above, allows a new method of manufacturing a support plate of an electrowetting element to be used. This will be described later. The properties of the different material mean that in examples it is unnecessary to treat a surface of a layer of the different material to reduce its hydrophobicity for then forming the walls thereon; instead, the polar functionality of the different material molecule for example gives a suitable affinity for the wall material, leading to good adhesion of wall material to the second surface. The polar functionality in examples may be considered to mimic a surface of a layer of Teflon® 1600 for example after the known method of treating the surface using RIE to provide a less hydrophobic surface for applying the walls to. Moreover, in examples, the first surface remains less wettable for the wall material, due to the presence of the apolar part of the different material molecule, and more wettable for the first fluid. This can simplify a method of manufacturing a support plate as it is not necessary also to perform a reflow step, or equivalent, to restore a hydrophobicity of a surface for adjoining the first fluid in the electrowetting element. Further, this can reduce adhesion of remnants of wall material to the display area, giving better display and/or switching performance to the electrowetting element. For example; the first surface may be hydrophobic whilst the second surface is hydrophilic, without requiring any heat treatment to restore a hydrophobicity of the material. Instead, as explained further below, the different material molecule can configure itself, for example by orientating different parts of the molecule to provide the different surface wettability properties of the first and second surfaces. For example, due to the presence of external forces, for example dipole forces provided by polar groups in a wall material, an attraction to a wall material when applied on a surface of the different material, polar functional groups may orientate themselves towards, and possibly to at least partly insert themselves within, the wall material such as SU8 which has polar properties. Further, for example, due to the presence of a layer such as the barrier layer underneath the layer comprising the different material, non-polar parts of the different material molecules may orientate themselves towards the first surface, for example due to an attraction of the polar functional groups to the underlying material forming the barrier layer. The different material therefore can, depending on the orientation of the polar functional groups, provide both a surface such as the first surface which is more wettable to the first fluid and less wettable to the wall material and also a surface such as the second surface which, compared with the first surface, is more wettable to the wall material and less wettable to the first fluid.

In examples the polar functionality described above may be considered to be substantially polar and the apolar functionality described above may be considered to be substantially apolar. Substantially in such examples means for example that the polar and apolar parts of the molecules are polar and apolar respectively, in accordance for example with the different atom to atom bonds which are considered polar or non-polar as explained above, but moreover such that the substantially polar and substantially apolar parts of the molecule perform the functions described herein, for example in relation to interacting with wall material when applied to a surface of the different material. Moreover, the term substantially is used to account for any transient and relatively minor changes in polarity due to movement of electrons within the molecule.

In some examples, the different material has the following formula: $R^1$-$A_n$-$R^2$, wherein R' is a first terminus group; $R^2$ is a second terminus group; n is an integer equal to or greater than 2; and each A is independently selected from the group consisting of: $R^3$ having the formula —$CF_2CF_2$—, which may be considered a first monomer, or $R^4$ having the formula —$CFR^5CF_2$—, which may be considered a second monomer, wherein $R^5$ has the formula -L-Q, wherein L is a linker group and Q is a substantially polar group, and wherein $A_n$ includes at least one of $R^3$ and at least one of $R^4$. The linker group L is in examples sufficiently long and flexible such that the position of the substantially polar group Q may change, relative to the backbone, depending on external forces. A polarity of the linker group L may be selected depending on the desired properties of the material.

In examples, the linker group L of at least one of $R^5$ is independently selected from the group consisting of: a single bond, a straight chain alkylene group, a branched alkylene group, a straight chain fluoroalkylene group, a branched fluoroalkylene group, a perfluorinated straight chain alkylene group, or a perfluorinated branched alkylene group.

In examples, the linker group L of at least one, for example all, of $R^5$ is independently selected from the group consisting of: a straight chain alkylene group containing, i.e. having, 2 to 10 carbon atoms, a straight chain fluoroalkylene group containing 2 to 10 carbon atoms, or a perfluorinated straight chain alkylene group containing 2 to 10 carbon atoms. The number range 2 to 10 carbon atoms includes all integer numbers within the range, i.e. 2, 3, 4, 5, 6, 7, 8, 9 and 10. It has been found that this range of carbon atoms provides suitable flexibility and length for the linker group L. In some examples the linker group may contain 2 to 3, 4 to 5, 6 to 7, or 8 to 10 carbon atoms; depending on the specific formulation of the first and second fluids for example and the wall material being used, these sub-ranges of carbon atoms provide desired properties of the material for wall adhesion for the second surface and hydrophobicity for the first surface, for example.

In examples, the linker group L of at least one, for example all, of $R^5$ has the following formula: —$R^6R^7R^8$—, wherein $R^6$ is one of: a single bond, a straight chain alkylene group, a branched alkylene group, a straight chain fluoroalkylene group, a branched fluoroalkylene group, a perfluorinated straight chain alkylene group, or a perfluorinated branched alkylene group; in any such examples other than the single bond example, $R^6$ may contain for example 1, 2, 3, 4 or 5 carbon atoms. In some examples, where $R^6$ is a straight chain alkylene group, which may be a fluoroalkylene or perfluorinated, $R^6$ contains one carbon atom C. This has been found to give favourable flexibility properties to the side chain, but in further examples a different number of carbon atoms for forming the $R^6$ group are envisaged.

In such examples, $R^7$ may have one of the following formula: —$CHR^9$—, —$CFR^9$, or —$CR^9R^9$—, wherein each said $R^9$ is independently selected from the group consisting of: a straight chain alkyl group, a branched alkyl group, a straight chain fluoroalkyl group, a branched fluoroalkyl group, a perfluorinated straight chain alkyl group, or a perfluorinated branched alkyl group. In examples $R^9$ is a methyl group, i.e. $R^9$ contains one carbon atom C, which is found to give favourable properties in terms of flexibility of the side chain. Other examples are envisaged with $R^9$ containing a different number of carbon atoms.

Further, in such examples, $R^8$ may be a straight chain alkylene group, a straight chain fluoroalkylene group, or a perfluorinated straight chain alkylene group. $R^8$ of at least one, for example all, of the linker group L may in some examples independently contain 1 to 8 carbon atoms. This provides a suitable extent of flexibility to the end of the side chain and therefore gives more freedom for repositioning of the polar functional group Q, depending on external forces. The range 1 to 8 carbon atoms includes integer values within the range, i.e. 1, 2, 3, 4, 5, 6, 7, 8. In some examples $R^8$ contains 1 to 3, 4 to 5, or 6 to 8 carbon atoms. Again, depending on the specific formulation of the first and second fluids for example and the wall material being used, for example, these sub-ranges of carbon atoms provide desired properties of the material for wall adhesion for the second surface and hydrophobicity for the first surface, for example.

In some examples, $R^8$ of at least one, for example all, of linker group L comprises at least 5 atoms. For example, each linker group L may comprise 6 atoms, which corresponds with an example where $R^8$ is an ethylene group which may be a fluoroethylene group or perfluorinated. For example, where $R^8$ is a perfluorinated alkylene group, $R^8$ has the formula —$CF_2CF_2$— and therefore comprises at least 6 atoms. With at least 5 atoms in some examples, the side chain provides suitable flexibility at its end, for repositioning of the polar functional group Q.

In some examples, the linker group L of at least one, for example all, of $R^5$ is independently one of: an ether group, for example containing 1 to 8 carbon atoms (i.e. 1, 2, 3, 4, 5, 6, 7, or 8 carbon atoms), a fluoroether group for example containing 1 to 8 carbon atoms (i.e. 1, 2, 3, 4, 5, 6, 7, or 8 carbon atoms), a perfluorinated ether group for example containing 1 to 8 carbon atoms (i.e. 1, 2, 3, 4, 5, 6, 7, or 8 carbon atoms), or a group having one of the following formula: —$O(CH_2)_z$—, —$O(CF_2)_z$—, —$(OCH_2CH_2)_x$—, —$OR^6R^7OR^8$—, —$O(R^6R^7O)_zR^8$—, or —$OR^6R^7(OCH_2CH_2)_x$—, wherein $R^6$ is one of: a single bond, a straight chain alkylene group, a straight chain fluoroalkylene group, or a perfluorinated straight chain alkylene group, for example an example of $R^6$ described previously.

In examples, $R^7$ has one of the following formula: —$CHR^9$—, or —$CR^9R^9$—, or $R^7$ is one of a straight chain alkylene, a straight chain fluoroalkylene, or a perfluorinated straight chain alkylene.

In some such examples, at least one, for example all, of each $R^9$ is independently one of: a straight chain alkyl group, a branched alkyl group, a straight chain fluoroalkyl group, a branched fluoroalkyl group, a perfluorinated straight chain alkyl group, or a perfluorinated branched alkyl group. In some examples $R^9$ is a methyl group, which in some examples helps to maintain flexibility of the side chains.

In some further such examples, $R^8$ is a straight chain alkylene group, a straight chain fluoroalkylene group, or a perfluorinated straight chain alkylene group. In some examples, each $R^8$ independently contains 1 to 8 carbon atoms, i.e. a value 1, 2, 3, 4, 5, 6, 7, or 8 and may have a value within a sub-range containing 1 to 3, 4 to 5, or 6 to 8 carbon atoms. Again, 1 to 8 carbons gives the side chain a suitable flexibility for positioning the polar functional group Q. Further, each $R^8$ in some examples independently comprises at least 5 atoms, similar to the explanation given above in relation to the linker group comprising at least 5 atoms. In some examples, $R^7$ and $R^8$ are respectively a straight chain alkylene group and a perfluorinated straight chain alkylene group.

z is an integer with a value selected from the range 1 to 8, i.e. a value 1, 2, 3, 4, 5, 6, 7, or 8 and may have a value within a sub-range containing 1 to 3, 4 to 5, or 6 to 8 carbon atoms. Again, 1 to 8 carbons gives the side chain a suitable flexibility for positioning the polar functional group Q.

x is an integer with a value selected from the range 1 to 3, i.e. a value 1, 2, or 3 —(OCH$_2$CH$_2$)— groups.

In some specific examples, the linker group L has one of the following formula: —OCF$_2$CF(CF$_3$)O(CF$_2$)$_{1-8}$—; —OCF$_2$C(CF$_3$)$_2$O(CF$_2$)$_{1-8}$—; —OCF$_2$CF$_2$O(CF$_2$)$_{1-8}$—; —O(CF$_2$CF$_2$O)$_{1-8}$(CF$_2$)$_{1-8}$—; —OCF$_2$CF(CF$_3$)$_2$O(CH$_2$)$_{1-8}$—; —OCF$_2$C(CF$_3$)$_2$O(CH$_2$)$_{1-8}$—; —OCF$_2$CF$_2$O(CH$_2$)$_{1-8}$—.

In some other specific examples, the linker group L has one of the following formula: —OCF$_2$CF(CF$_3$)(OCH$_2$CH$_2$)$_{1-3}$—; —OCF$_2$C(CF$_3$)$_2$(OCH$_2$CH$_2$)$_{1-3}$—; —OCF$_2$CF$_2$(OCH$_2$CH$_2$)$_{1-3}$—; —O(CF$_2$CF$_2$O)$_{1-8}$(OCH$_2$CH$_2$)$_{1-3}$—.

As explained above, a polar group Q, for example each polar group Q, comprises for example a hydrogen atom H bonded to an oxygen atom O, a nitrogen atom N, or a sulphur atom S. In some examples, each Q for each side chain is independently selected from the group consisting of: —OH, i.e. a hydroxyl group, —COOH, i.e. a carboxylic acid, SO$_3$H, i.e. a sulphonic acid, NH$_2$, i.e. a primary amine, or CONH$_2$, i.e. an amide. In specific examples, for example those described herein, with the linker group L including the group (OCH$_2$CH$_2$)$_x$—, with $_x$ having an integer value in the range 1 to 3, the polar group Q is —OH. Known fluoropolymers for forming a hydrophobic layer of an electrowetting element lack any such polar groups.

In an example, the $A_n$ material has the following formula: $R^1$—[(CF$_2$CF$_2$)$_f$(CF(OCF$_2$CF(CF$_3$)OCF$_2$CF$_2$COOH)CF$_2$)$_{1-f}$]—$R^2$ which is an example of an ionomer. Therefore, $R^3$ is —(CF$_2$CF$_2$)—, i.e. a first monomer of a polymer of the material and $R^4$ is —(CF(OCF$_2$CF(CF$_3$)OCF$_2$CF$_2$COOH)CF$_2$)—, i.e. a second monomer of the material. f represents a proportion, for example a fraction, of the first monomers in the polymer and therefore the proportion, for example a fraction of second monomers in the polymer is 1-f. This example may be referred to as the polymer with the trade name Flemion™ which is an example of an ionomer and which is supplied by Asahi Glass of 1-5-1, Marunouchi, Chiyoda-ku, Tokyo 100-8405, Japan.

Flemion™ is similar to the polymer with the trade name Nafion™ except that in Nafion™ the —COOH group is instead SOOOH. Nafion™ is supplied by Dupont of Wilmington, Del., U.S.A.

The skilled person will readily be aware how to synthesise a material in accordance with examples described herein. For example, Flemion™ may be used, suitably prepared for coating an underlying surface of a support plate as will be explained below. Examples of a method of synthesising a monomer of Flemion™, in accordance with the journal article with reference Modern Chlor-Alkali Technology 1992, pp 59-67, the contents of which are included herein by way of reference, are now described:

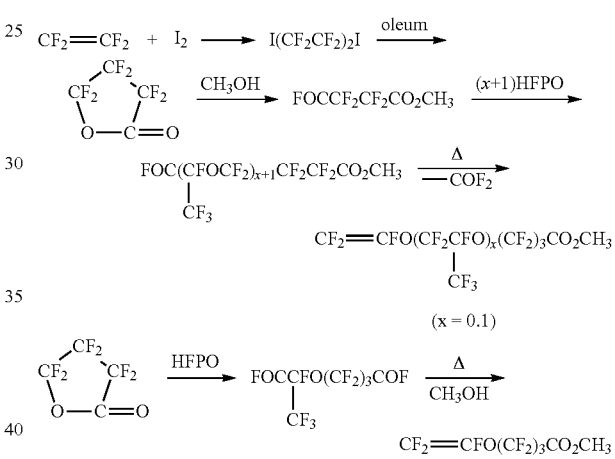

In another example, Nafion™ may be modified as the skilled person will understand to substitute the —SOOOH group with a required polar functional group, such as —COOH or —OH. In other examples, a method similar to that used to synthesise Nafion™ may be used, modified accordingly, in accordance with the skilled person's understanding. An example of a method for synthesising a monomer of Nafion™ is now described:

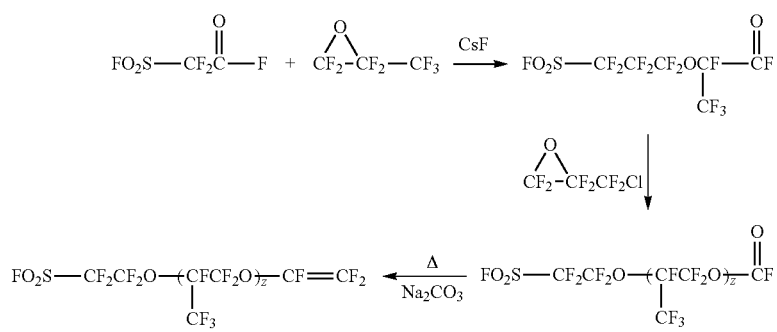

The above illustrates the principle of the preparation of Nafion membrane according to D. J. Connolly and W. F. Gresham, U.S. Pat. No. 3,282,875 (1966). Further details of an example of synthesising Nafion™ may be found in the journal article with reference: Journal of New Materials for Electrochemical Systems 1, 47-66 (1998).

Another reaction which may be used to synthesise perfluorinated monomers according to examples described herein is now described in relation to Nafion™, though it is to be appreciated that the method may be modified accordingly for different perfluorinated monomers, as the skilled person will understand. Reference is made to the book 'Fluorinated Ionomers', Second Ed., Walther Gro, page 15, the contents of which is enclosed herein. These reactions are catalysed by fluoride ions; caesium fluoride (CsF) is preferred due to its solubility in solvents such as diglyme, tetraglyme, acetonitrile and adiponitrile. Tetrafluoroethane (TFE) sultone can be used for the reaction directly or after fluoride ion catalysed ring opening, as will become clear from the following diagrams.

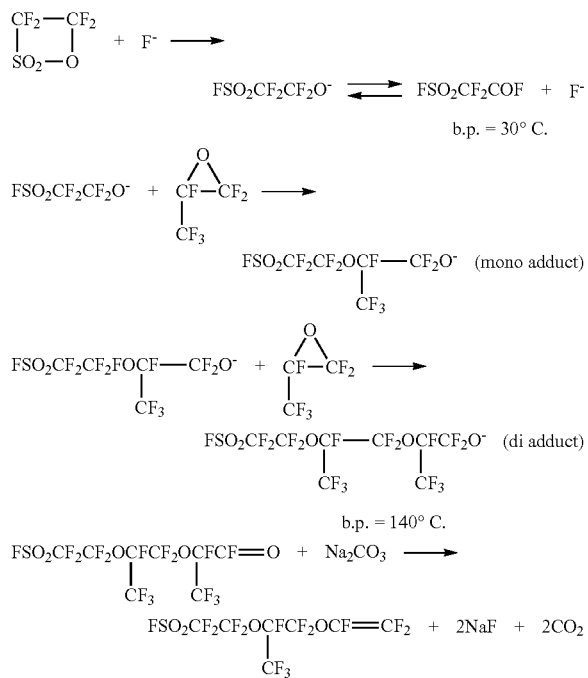

Another synthesis method which may be used to synthesise a material of examples described herein, modified accordingly as the skilled person will understand, is now given in relation to the preparation of PFA, and is taken from the journal Applied Sciences 2012, 2, page 258:

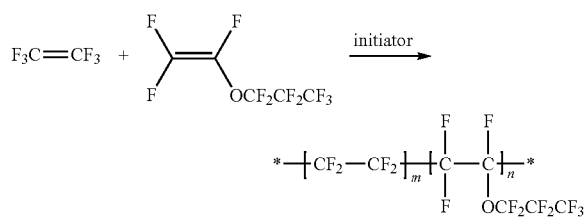

Depending on the proportions of monomers which are polymerised to form the material, the proportions of different types of monomers in the polymer may be controlled. For example, a ratio of the number of $R^3$ monomers and $R^4$ monomers, i.e. the ratio $R^3:R^4$ is in the range of 1:2 to 4:1. i.e. the fraction of the number of $R^3/R^4$ may be in the range of 0.5 to 4. It is desirable to control the proportion of substantially polar groups in the polymer molecule to for example permit suitable application, for example spreading, of a wall material on the material forming the layer 15.

The total number of $R^3$ and $R^4$ monomers in the polymer may be controlled in dependence on the synthesis method. For example, the polymer may have a molecular weight of 400 to 400,000 Daltons. For example, the number of monomers may be comparable with that of Nafion™. The polymerisation and synthesis may be controlled to determine the properties of the polymer molecules; for example, a suitable viscosity may be necessary for the method of applying the material to an underlying surface during manufacture. Such a viscosity may for example be a dynamic viscosity of 125 centipoise at room temperature of 21 degrees Celsius.

However, it may be desirable that the material is not too viscous, otherwise this may affect the ability of the molecules to reconfigure when applying the wall material, as explained further below.

In some examples, the material may be synthesised such that at least some parts of the molecule and in some examples substantially all (for example 95% or more) of the molecule is formed by an alternating sequence of the $R^3$ and $R^4$ groups, for example having the following formula which may have further sequential repetitions of the $-(R^3R^4)-$ dimer. In other examples, the $R^3$ and $R^4$ monomers may not form an alternating sequence and may instead, at least in parts, form a random sequence.

In examples, the first terminus group is selected from the group consisting of: H, F, or an initiating group formed by an initiator for initiating a polymerisation reaction to form a polymer molecule of the material. Further, in examples, the second terminus group is selected from the group consisting of: H, F, or a terminating group formed by a terminator for terminating a polymerisation reaction to form a polymer molecule of the material. An example of those groups could be pentafluoroethylene (TFE) with the formula $CF_3CF_2-$ or heptafluoropropylene with the formula $CF_3CF_2CF_2-$.

Figure 3:
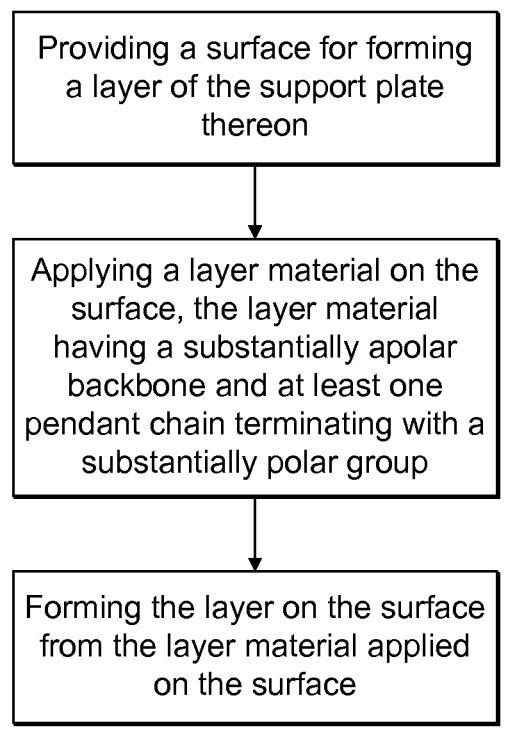
FIG. 3 is a flow diagram showing an example method of manufacture.

An example of a method of manufacturing a support plate for at least one electrowetting element will now be described with reference to features of FIGS. 1 and 2 and also to FIG. 3. During the manufacturing process of the display device, the first support plate may be manufactured entirely, or may be provided during the manufacturing process as a partly or completely assembled support plate. When manufacturing the first support plate according to an example the substrate 7 is provided. An electrode layer comprising at least one electrode 17, corresponding to the first electrode described above, is provided on the substrate 7. A material for forming the at least one electrode is provided on a surface for example that of the substrate and the material is patterned for forming the at least one electrode according to a desired pattern. Where the first electrode material is for example ITO, a plasma enhanced chemical vapour deposition technique or a DC (direct current) magnetron sputtering technique may be used, as the skilled person would know.

Subsequently, the insulating layer 13, which in this example includes the barrier layer 16 and the layer comprising the different material, is provided on the first electrode structure. With the barrier layer being formed of a dielectric material, in examples, a dielectric material is provided on the material patterned for forming the electrode, thereby forming a layer of the dielectric material on the electrode. This providing of the dielectric material, for example to form the barrier layer, may be provided using Chemical Vapour Deposition (CVD) or Physical Vapour Deposition (PVD) for example sputter deposition or electron beam evaporation where temperature, pressure and power are controlled appropriately, as would be understood by the skilled person. The layer 15 comprising the different material may then be formed on a surface of in this example the barrier layer, or in other examples on the electrode layer, for example by applying the material for forming the layer using for example a wet coating process such as slit coating, flexoprinting, spin coating or dip coating as is well known in the art. This therefore forms a layer of the material comprising the different material on the surface of the barrier layer in this example. The layer 15 in the examples given here is a continuous uninterrupted layer of the first support plate common to all picture elements.

In examples, after the layer 15 has been formed, the layer of the different material, which is for example ionomeric, provides a surface which is in this example a wettability suitable for adjoining a fluid of the electrowetting element described above, such as the first fluid; the surface may therefore be hydrophobic. This is for example due to an attraction of the polar groups of the molecules being attracted to the underlying material on which the layer of material is formed. Thus, in a region of the layer for forming the first surface, the molecules are configured such that at least one side chain of the molecules is orientated away from the surface of the material layer, towards the bulk of the material, such that the polar functional group(s) are located away from the first surface.

At least one wall may then be formed, for example by photolithography using a SU8 photoresist material, which would be well known to the skilled person. More specifically, a wall material may be spread across at least part of the surface of the layer of the different material and then patterned using for example photolithography with ultraviolet light applied selectively, using a mask, to the applied wall material. After then hard baking the patterned wall material, the patterned wall material is developed, leaving the formed walls. In examples described herein, the wall material is patterned so as to form at least one wall on the second surface. Thus, a wall material may be applied on a second surface of the layer of material, for example an ionomeric material described herein, the second surface being a surface on which the walls are to be formed. In examples, when applying the wall material, a first surface of the layer of material is also covered by the wall material, but is later removed during the development step, which can cause the side chains to reorientate themselves from being with the polar groups attracted to the applied wall material to point towards the bulk of the layer 15, away from the first surface, thus providing a hydrophobic first surface. The first surface as explained above corresponds to the display area.

In more detail, upon applying the wall material on the second surface, the different material, for example the ionomeric material of examples described herein, in the underlying layer reconfigures in a region of the layer forming the second surface to provide the second surface with a more wettable surface to the wall material than the first surface. Thus, after forming the at least one wall, the second surface may be more wettable to water than the first surface without any treatment of the surface of the layer being necessary before applying the wall material, for example using RIE. The reconfiguring occurs due to an attraction between the polar functional groups of the material and the wall material applied on the second surface. Therefore, in examples, this attraction causes one or more further side chains of the molecules pendant from the substantially apolar backbone to, at the second surface, at least partly insert themselves and therefore insert the polar functional group(s) of the pendant side chain within the wall material applied on the second surface. This insertion of the polar groups into the wall material in examples improves adhesion of the wall material to the underlying layer. Moreover, the polar groups may help to spread the wall material at least on the second surface, due to their attraction to the wall material, thus improving a closeness of join between the wall material and the second surface.

After applying the wall material, the wall material when it is a photoresist is developed using an appropriate masking and development technique, as explained above and as the skilled person will understand. This may require a hard baking step to harden the wall material applied on the second surface, which hard baking may be performed at a temperature of approximately 180 degrees Celsius. It is noted that, compared to known techniques, it is not then necessary to perform a reflow step at a higher temperature, since the first surface of the layer of material is suitable for its function in the electrowetting element upon the material having been applied to form the layer. Thus in examples a better quality display area is provided, for example due to not having to treat the display area with RIE and also for example as there is therefore no consequential contamination of the display area with wall material. By using the different material of examples described herein, a simpler manufacturing technique compared with known techniques may be used.

Once the first support plate is manufactured it may be assembled with a pre-manufactured second support plate, to assemble one or more electrowetting elements by attaching the first and second support plates together, for example using an adhesive seal at an outermost perimeter of an array of the one or more electrowetting elements, after having provided the first and second fluids in the space to be formed between the first and second support plates. The skilled person will readily appreciate suitable techniques for this.

It is to be noted that the phrase "wall material" is used to cover a material from which at least one wall is to be formed, for example a pre-cursor wall material, a material which forms at least one wall after a wall formation process and any intermediate material formed during formation of at least one wall. It is also to be appreciated that other manufacturing methods may be used to manufacture the first support plate.

The above examples are to be understood as illustrative examples. Further examples are envisaged. For example, although examples are described above in relation to a display element, it is envisaged that use of a different material as described herein, for example an ionomeric material, may be used in other types of electrowetting element, for example an electrowetting lens.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:
1. An electrowetting element comprising:
a support plate having a layer with a first surface for adjoinment by a fluid, wherein the layer is formed at least partly of a material having a backbone which is substantially apolar and at least one chain pendant from the backbone and terminating with a substantially polar group.

2. An electrowetting element according to claim 1, wherein the material is at least one of: an ionomer, an amphiphile, a material with the substantially apolar backbone being hydrophobic, or a material with the substantially polar group being hydrophilic.

3. An electrowetting element according to claim 1, wherein the material has the following formula:

$$R^1\text{-}A_n\text{-}R^2,$$

wherein $R^1$ is a first terminus group;
$R^2$ is a second terminus group;
n is an integer equal to or greater than 2; and
each said A is independently selected from the group consisting of:
$R^3$ having the formula —$CF_2CF_2$—, or
$R^4$ having the formula —$CFR^5CF_2$—,
wherein $R^5$ has the formula -L-Q, wherein L is a linker group and Q is a substantially polar group, and
wherein $A_n$ includes at least one of $R^3$ and at least one of $R^4$.

4. An electrowetting element according to claim 3, wherein said linker group L of at least one of said $R^5$ is independently selected from the group consisting of:
a single bond, a straight chain alkylene group, a branched alkylene group, a straight chain fluoroalkylene group, a branched fluoroalkylene group, a perfluorinated straight chain alkylene group, or a perfluorinated branched alkylene group.

5. An electrowetting element according to claim 3, wherein said linker group L of at least one of said $R^5$ is independently selected from the group consisting of:
a straight chain alkylene group containing 2 to 10 carbon atoms, a straight chain fluoroalkylene group containing 2 to 10 carbon atoms, or a perfluorinated straight chain alkylene group containing 2 to 10 carbon atoms.

6. An electrowetting element according to claim 3, wherein said linker group L of at least one of said $R^5$ has the following formula:

$$-R^6R^7R^8-,$$

wherein $R^6$ is one of: a single bond, a straight chain alkylene group, a branched alkylene group, a straight chain fluoroalkylene group, a branched fluoroalkylene group, a perfluorinated straight chain alkylene group, or a perfluorinated branched alkylene group;
wherein $R^7$ has one of the following formula: —$CHR^9$—, —$CFR^9$, or —$CR^9R^9$—, wherein each said $R^9$ is independently selected from the group consisting of: a straight chain alkyl group, a branched alkyl group, a straight chain fluoroalkyl group, a branched fluoroalkyl group, a perfluorinated straight chain alkyl group, or a perfluorinated branched alkyl group; and
wherein $R^8$ is a straight chain alkylene group, a straight chain fluoroalkylene group, or a perfluorinated straight chain alkylene group.

7. An electrowetting element according to claim 6, wherein said $R^8$ of at least one of said linker group L independently contains 1 to 8 carbon atoms.

8. An electrowetting element according to claim 6, wherein said $R^8$ of at least one of said linker group comprises at least 5 atoms.

9. An electrowetting element according to claim 3, wherein said linker group L of at least one of said $R^5$ is independently one of:
an ether group, a fluoroether group, a perfluorinated ether group, or a group having one of the following formula:

—$O(CH_2)_z$—,

—$O(CF_2)_z$—,

—$(OCH_2CH_2)_x$—,

—$OR^6R^7OR^8$—,

—$O(R^6R^7O)_zR^8$—, or

—$OR^6R^7(OCH_2CH_2)_x$—, wherein $R^6$ is one of: a single bond, a straight chain alkylene group, a branched alkylene group, a straight chain fluoroalkylene group, a branched fluoroalkylene group, a perfluorinated straight chain alkylene group, or a branched perfluorinated alkylene group;
wherein $R^7$ has one of the following formula: —$CHR^9$—, or —$CR^9R^9$—, or is one of a straight chain alkylene, a straight chain fluoroalkylene, or a perfluorinated straight chain alkylene,
wherein each said $R^9$ is independently one of: a straight chain alkyl group, a branched alkyl group, a straight chain fluoroalkyl group, a branched fluoroalkyl group, a perfluorinated straight chain alkyl group, or a perfluorinated branched alkyl group;
wherein $R^8$ is a straight chain alkylene group, a straight chain fluoroalkylene group, or a perfluorinated straight chain alkylene group;
wherein z is an integer with a value selected from the range 1 to 8; and
wherein x is an integer with a value selected from the range 1 to 3.

10. An electrowetting element according to claim 9, wherein each said $R^8$ independently contains 1 to 8 carbon atoms.

11. An electrowetting element according to claim 9, wherein each said $R^8$ independently comprises at least 5 atoms.

12. An electrowetting element according to claim 3, wherein each said Q independently comprises a hydrogen atom bonded to one of: an oxygen atom, a nitrogen atom, or a sulphur atom.

13. An electrowetting element according to claim 3, wherein each said Q is independently selected from the group consisting of: —OH, —COOH, $SO_3H$, $NH_2$, or $CONH_2$.

14. An electrowetting element according to claim 3, wherein a ratio $R^3:R^4$ is in the range of 1:2 to 4:1.

15. An electrowetting element according to claim 3, wherein said $A_n$ comprises at least one alternating sequence of said $R^3$ and said $R^4$.

16. An electrowetting element according to claim 3, wherein a polymer molecule of the ionomer has a molecular weight of 400 to 400,000 Daltons.

17. An electrowetting element according to claim 3, wherein the first terminus group is selected from the group consisting of: H, F, or an initiating group formed by an initiator for initiating a polymerisation reaction to form a polymer molecule of said material; and
wherein the second terminus group is selected from the group consisting of: H, F, or a terminating group formed by a terminator for terminating a polymerisation reaction to form a polymer molecule of said material.

18. An electrowetting element according to claim 1, comprising at least one wall formed on a second surface of the layer, the second surface being more wettable to water than the first surface.

19. An electrowetting element according to claim 18, wherein in a region of the layer forming the first surface, one or more side chain of said at least one side chain is orientated such that the respective substantially polar functional group is located away from the first surface, and in a region of the layer forming the second surface, a further one or more of said at least one side chain is orientated such that the respective substantially polar functional group is located within a material forming the at least one wall.

20. A method of manufacturing a support plate for an electrowetting element comprising:
    i) providing a surface for forming a layer of the support plate thereon;
    ii) applying a layer material on said surface, the layer material having a substantially apolar backbone and at least one pendant chain terminating with a substantially polar group; and
    iii) forming the layer on said surface from said layer material applied on the surface.

21. A method according to claim 20, wherein upon said forming the layer on said surface, the layer provides a first surface of the support plate having a wettability for adjoining a fluid of an electrowetting element.

22. A method according to claim 20 comprising:
    iv) applying a wall material on a first surface and a second surface of the layer, for forming at least one wall on the second surface, the layer material reconfiguring upon said applying the wall material, to provide the first surface and the second surface with a more wettable surface to the wall material than before said applying the wall material.

23. A method according to claim 22, the layer material reconfiguring including the layer material reconfiguring to at least partly insert at least one said substantially polar group into the wall material applied on the second surface.

24. A method according to claim 22, including removing wall material applied to the first surface during iv), the layer material reconfiguring to provide the first surface with a wettability for adjoining a fluid of an electrowetting element, the first surface being more wettable for said fluid than said second surface.

* * * * *